United States Patent [19]

Gauert et al.

[11] Patent Number: 4,556,319
[45] Date of Patent: Dec. 3, 1985

[54] SENSOR OF ROTATIONAL VELOCITY ON THE BASIS OF A RING LASER

[75] Inventors: Rolf Gauert; Rüdiger K. Rodloff, both of Brunswick; Gerald H. Siol, Bad Münder, all of Fed. Rep. of Germany

[73] Assignee: Deutsche Forschungs- und Versuchsanstalt fur Luft- und Raumfahrt e.V., Cologne, Fed. Rep. of Germany

[21] Appl. No.: 368,574

[22] Filed: Apr. 15, 1982

[30] Foreign Application Priority Data

Apr. 21, 1981 [DE] Fed. Rep. of Germany ....... 3115869

[51] Int. Cl.$^4$ .............................................. G01C 19/64
[52] U.S. Cl. ...................................... 356/350; 372/94
[58] Field of Search .................. 356/350, 351; 372/94, 372/105, 106

[56] References Cited

U.S. PATENT DOCUMENTS

| | | | |
|---|---|---|---|
| 3,537,027 | 10/1970 | Smith | 372/94 X |
| 3,741,657 | 6/1973 | Andringa | 356/350 |
| 3,851,973 | 12/1974 | Macek | 356/350 |
| 4,222,668 | 9/1980 | Henry | 356/350 |
| 4,246,549 | 1/1981 | Carter et al. | 356/350 |
| 4,271,397 | 6/1981 | Stiles et al. | 356/350 |

FOREIGN PATENT DOCUMENTS

| | | |
|---|---|---|
| 2209397 | 9/1972 | Fed. Rep. of Germany . |
| 2400346 | 7/1975 | Fed. Rep. of Germany . |
| 1141727 | 1/1969 | United Kingdom . |

OTHER PUBLICATIONS

R. E. McClure and E. Vaher, "An Improved Ring Laser Bias Element," Naecon-Report, IEEE National Aerospace and Electronics Conference, pp. 544–548, (1978).

*Primary Examiner*—Vincent P. McGraw
*Attorney, Agent, or Firm*—Gottlieb, Rackman & Reisman

[57] ABSTRACT

A sensor of rotational velocity on the basis of a ring laser having an external radiation path including one corner mirror of the active resonance space which is transparent to the radiation of the active resonance space and at least two corner mirrors in the external radiation path between which there is arranged a magnetically excited body consisting of a material with a magnetooptical effect to act as a bias element for the production of a phase shift. The corner mirror of the active resonance space which leads to the external radiation path has a transparency of at maximum 5% and the magnetically excited body consists of a material which can be magnetized to saturation. The body is, preferably, a Faraday cell which is constructed from a ferromagnetic compound, in particular a garnet compound.

3 Claims, 7 Drawing Figures

SENSOR OF ROTATIONAL VELOCITY ON THE BASIS OF A RING LASER

FIELD OF THE INVENTION

The invention relates to a sensor of rotational velocity on the basis of a ring laser having an external radiation path including one corner mirror which is transparent to radiation of the active resonance space and by means of which the radiation reaches two externally situated corner mirrors between which there is arranged a magnetically excitable body consisting of a substrate having a magneto-optical effect as a bias element to produce a phase shift.

DESCRIPTION OF THE PRIOR ART

In a known sensor of rotational velocity of this type (GB No. 1,141,727) that corner mirror by means of which radiation is transferred to the external radiation path is designed to be semi-transparent and the external radiation path is part of the active resonance space. In this known sensor a block of $SiO_2$ is used as the magnetically excited body on to which a magnetic field is applied parallel to the direction of movement of the waves. $SiO_2$ Faraday cells certainly permit high apparent speeds of rotation; but an important disadvantage resides in the fact that the cells are sensitive to external stray fields.

Excited ferromagnetic garnet compounds are insensitive to external stray fields; but these have such a strong absorption that when they are used in the active resonance space no oscillation is possible in the ring laser. Excited ferromagnetic garnet compounds have therefore only been used hitherto as magnetic mirrors. Their use as Faraday cells has been regarded as of little promise up to the present time (Naecon Report 1978, pp 544 to 548).

It is an object of the invention to produce a sensor of rotational velocity on the basis of a ring laser which is insensitive to external stray fields and which is in a position to achieve sufficiently high bias values.

SUMMARY OF THE INVENTION

This object is solved according to the invention in that in a sensor of rotational velocity of the aforesaid type, the corner mirror of the active resonance space which is transparent to the radiation of the active resonance space has a transparency of at maximum 5% and the magnetically excitable body consists of a substance capable of being magnetised to saturation. Preferably this body is a Faraday cell which is constructed from a ferromagnetic material preferably a garnet compound.

BRIEF DESCRIPTION OF THE DRAWINGS

An example in accordance with the invention is illustrated in the drawings and is described in detail in the following with reference to the drawings, in which.

DESCRIPTION OF THE PRIOR ART LASER CIRCUIT

Figure 1:
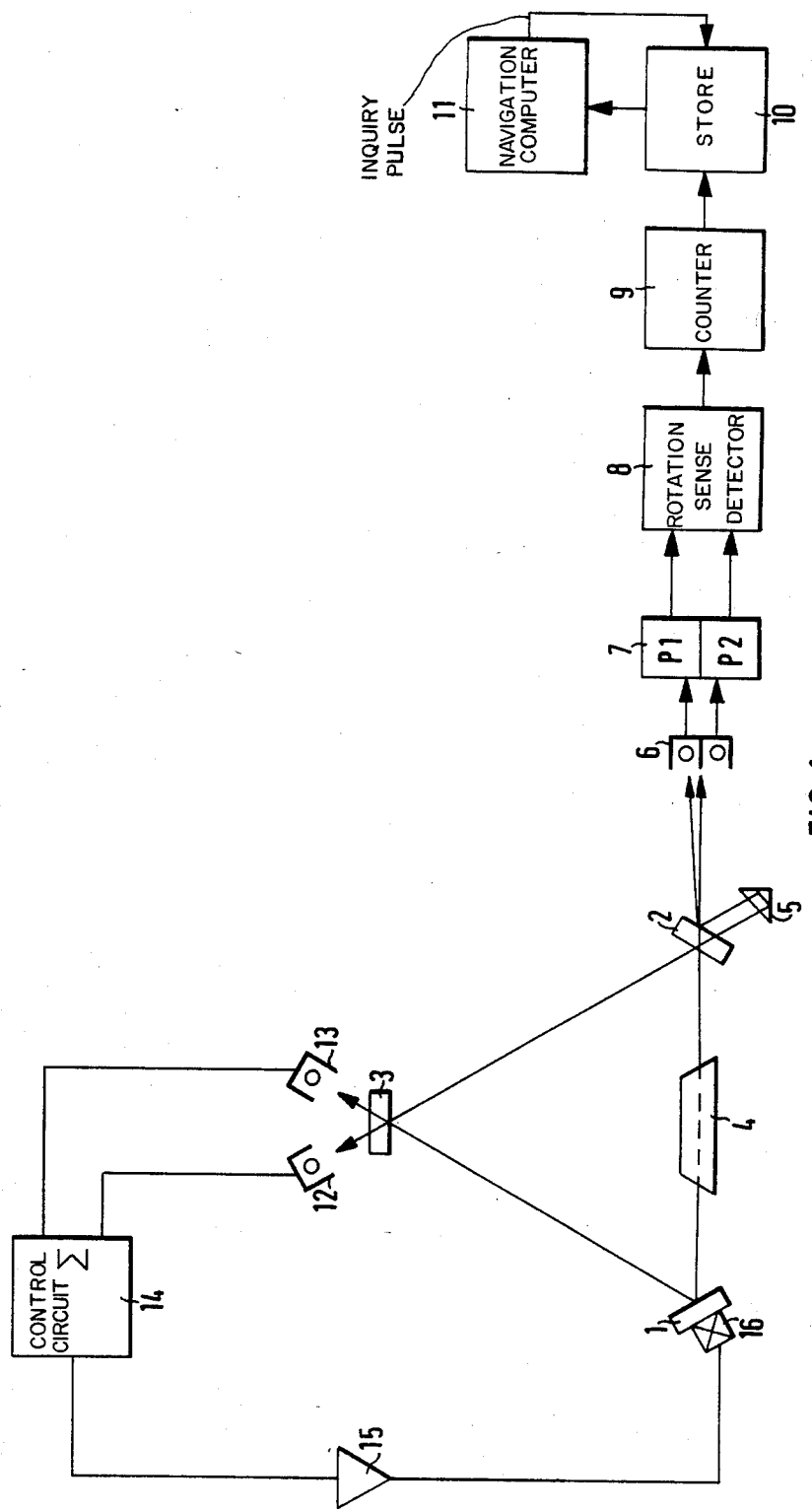
FIG. 1 shows schematically the circuit diagram of a sensor of rotational velocity of a known type.

A laser circuit such as is shown schematically in FIG. 1 consists of an arrangement of three mirrors 1, 2, 3 which form the ring resonator, a gas discharge tube 4 as active medium, an interference optical system 5 and diodes 6 which evaluate the interference fringe sample. The signals produced by the diodes 6 are transformed into rectangular pulses by the pulse former 7. A device 8 for identification of the direction of the rotational velocity distinguishes whether the pulses are to be added to the contents of a counter 9 or to be subtracted from it. The counter state is transferred to a store 10. This is fed into a navigation computer 11 by means of an inquiry pulse from the navigation computer 11. The adjustment of the length of the resonance space takes place by producing signals obtained from the mirror 3 with the help of diodes 12 and 13. A high voltage amplifier 15 is controlled by a suitable operating control circuit 14 which automatically adjusts the mirror 1 parallel to itself by means of a piezo timing device 16 so that the optical path length L (length of the resonance space) remains constant and thus the wavelength (Resonance space condition) is also constant.

$$L = m \cdot \lambda \text{ Resonance space condition} \quad (1)$$
$$m = \text{a whole number } (10^5-10^6)$$

In a system at rest the interference fringe sample is also at rest. When rotation of the system occurs about its vertical axis the contra-rotating wave trains experience a path change $\pm \Delta L$ which leads to a change in wavelength according to equation (1). Thus in the interference optical system 5 wave trains with difference frequencies with one another. This leads to the interference band sample traversing the diodes 6 with the beat frequency $\Delta \nu$.

$$\Delta \nu = \frac{4 \cdot F}{\lambda \cdot L} \omega \text{ where } F = \text{rotation surface and} \quad (2)$$
$$\omega = \text{velocity of rotation}$$

The formal relationship (2) shows the direct proportionality between $\Delta \nu$ and $\omega$.

Figure 2:
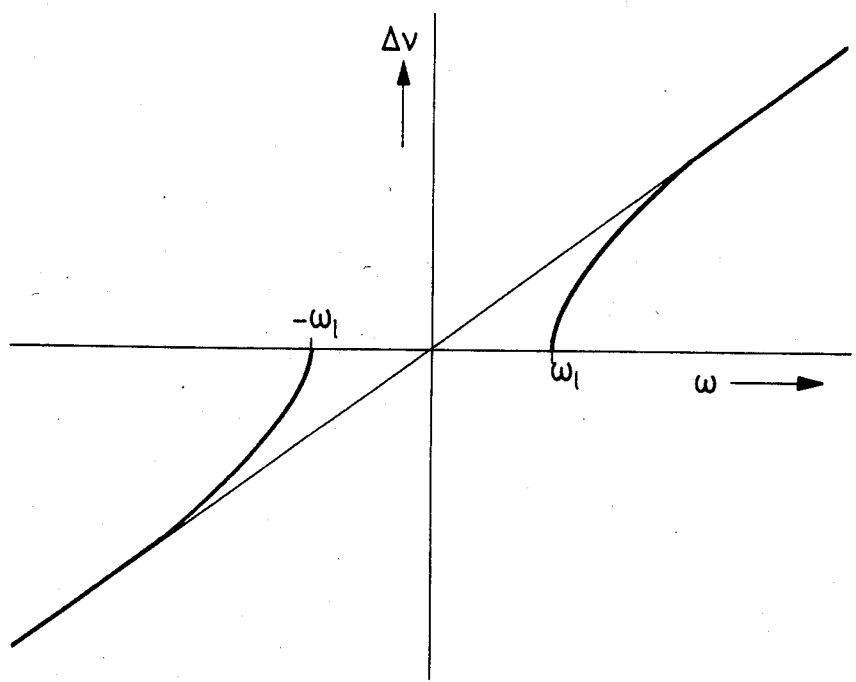
FIG. 2 shows the difference frequency $\Delta \nu$ plotted against the speed of rotation for laser circuits.

Back scattering by the laser mirrors 1, 2, 3 produces a coupling of the two rotating wave trains and thus a synchronisation at a fixed wavelength of frequency (the so-called Lock-in effect). The two wave trains are only uncoupled when a minimum speed of rotation $\omega_L$ (the Lock-in threshold) is exceeded and a beat frequency $\Delta \nu$ then becomes measurable by the diodes 6. FIG. 2 reproduces this relationship. The non-linearity in the region of the Lock-in threshold $\omega_L$ suggests the introduction of a constant or periodically variable bias which corresponds to a rate of rotation $\omega_B$ above the Lock-in threshold $\omega_L$.

Figure 3:
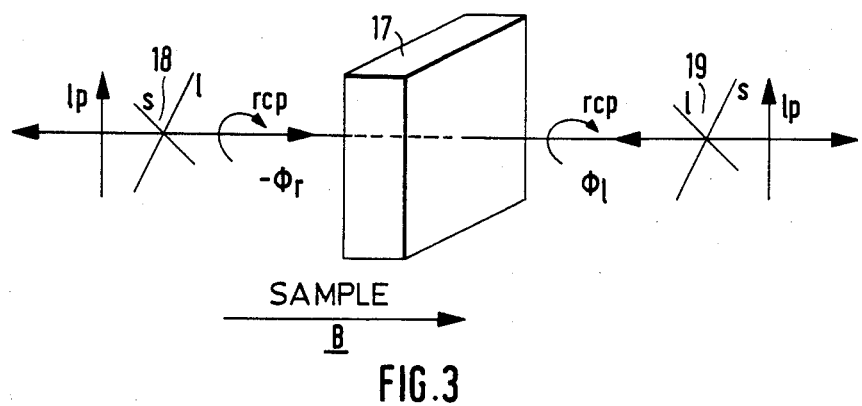
FIG. 3 shows the principle of a Faraday cell.

Phase displacement is possible to introduce a bias by means of magneto-optical elements. Magneto-optical elements lead to a non-reciprocal change $\pm \Delta$ in the optical wavelength for contra-rotating radiation beams, so that according to (1) difference frequencies arise for the wave trains that occur in a rotation of the system. A magneto-optical element is, for example, the Faraday cell, the construction of which is shown in FIG. 3. The linearly polarised radiation (lp) is transformed by means of a λ/4 wavelength plate 18 with axis s and slow axis 1 into left circularly polarised radition (lcp) which undergoes a phase shift $\phi_1$ in the sample 17 which is circularly double-refracting owing to the effect of the magnetic field, B, and which is again transformed by another λ/4 plate 19 with the axes s and 1 into a phase shift in the direction of propagation of the linearly polarised light 10. The wave travelling counter to the field direction experiences the circular phase shift-$\phi_r$. The total phase shift Δ which exists between the contra-rotating wave trains is then given by:

$$\Delta = \phi_1 - \phi_r \tag{3}$$

With a phase change Δ of 1 |′| a difference frequency arises which, according to equation 4, is (L=0.6 m) 23148 Hz.

$$\Delta \nu = \frac{c}{2\pi \cdot L} \cdot \Delta$$

Δ being in circular measure.

This corresponds to an apparent speed of rotation $\omega_B$ of 7.3°/s for a wavelength of 633 m. This phase shift of 1 |′| can easily be realised within the resonance space by conventional $SiO_2$ Faraday cells. However, an important disadvantage in this case is the susceptibility to external stray fields.

Excited ferromagnetic garnet compounds are insensitive to external stray fields. With a saturation field strength of about 8000 A/m (at λ=0.633 μm) Faraday rotations, $\theta_F$, of up to about 10,000°/cm are produced by these compounds. The Faraday rotation $\theta_F$ is related to the change in phase Δ by the following equation:

$$\Delta = r_1 - \phi_1 = 2\theta_F \tag{5}$$

With a sample thickness of 1 μm, phase shifts of 2° corresponding to an apparent speed of rotation of 873°/s may thus be expected. However, ferromagnetic garnet compounds have a strong absorption which in laboratory tested samples (of thickness d=0.5 μm and d=5 μm) is about 4% or 33.5% of the radiation output and is thus so high that at the wavelength 0.635 μm no oscillation is possible in the ring laser.

DESCRIPTION OF THE PREFERRED EMBODIMENTS

Figure 4:
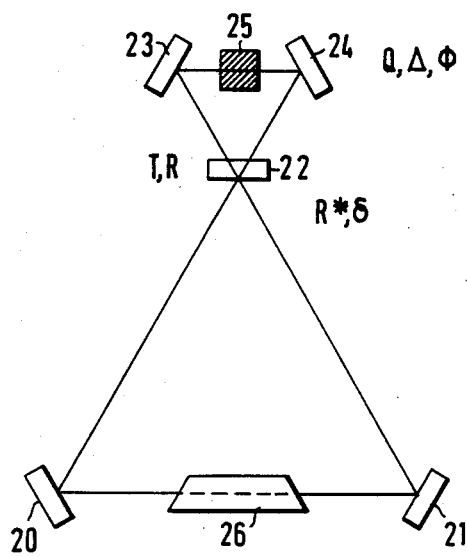
FIG. 4 shows, schematically, a ring laser constructed according to the invention having an external resonance space with a Faraday element.

According to the invention, the advantages of the ferromagnetic garnet compounds as enumerated herein may be utilised in that a Faraday cell constructed from ferromagnetic garnet compounds is introduced into a second radiation path (see FIG. 4). The mirrors 20, 21, 22 here form the first radiation path (internal resonance space) with the gas discharge tube 26 as active medium. The mirror 22 is partially transparent and has nominal transmission power T and nominal reflectivity R. The second radiation path (external resonance space) with the mirrors 22, 23 and 24 form a passive resonator into which there is integrated the Faraday cell 25 which produces the phase change and which has the "loss factor" Q. This factor Q includes the absorption losses in the second radiation path. The optical path through the mirrors 22, 23, 24 or 22, 24,23 corresponds to the phase relationship $\phi$ with reference to the original radiation. Owing to the feedback of the radiation at the mirror 22 to the normally reflected fraction it is possible to introduce a phase shift δ into the first radiation path which is determined by the parameters $\phi$, Q, Δ and T (see equation (6, 6a)). The reflectivity R of the uncoupling mirror 22 also changes in relation to $\phi$, Q, Δ and T (see equation 6a) and is denoted by R*.

$$\delta = \arctan \frac{\beta(\phi, \Delta/2)}{\alpha(\phi, \Delta/2)} - \arctan \frac{\beta(\phi, -\Delta/2)}{(\phi - \Delta/2)} \tag{6}$$

$$R^* = \alpha(\phi, \Delta/2)^2 + \beta\left(\phi, \frac{\Delta}{2}\right) \tag{6a}$$

with $\alpha = \alpha(\phi, \Delta)$ $$= -\sqrt{R} - \frac{T}{\sqrt{R}} \left| \frac{NQR \cdot (\sqrt{QR} - \cos(\phi + \Delta))}{1 + QR - 2\sqrt{QR}\cos(\phi + \Delta)} \right|$$

$$\beta = \beta(\phi, \Delta)$$

$$= \frac{T \cdot \sqrt{Q}\sin(\phi + \Delta)}{1 + QR - 2\sqrt{QR}\cos(\phi + \Delta)}$$

Figure 5:
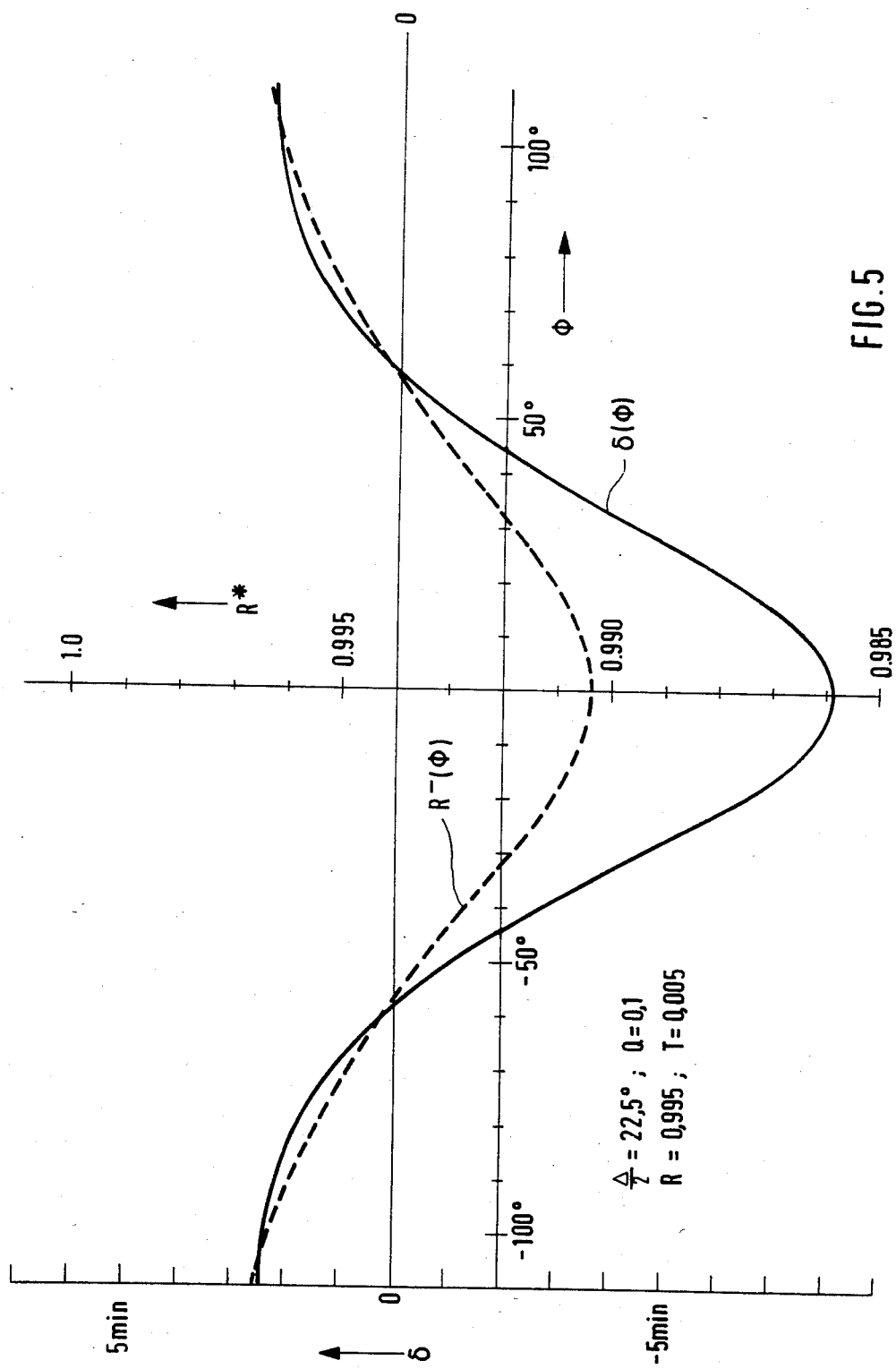
FIG. 5 shows the reflectivity $R^*$ and the phase shift $\delta$ as functions of the phase angle $\phi$.
Figure 6:
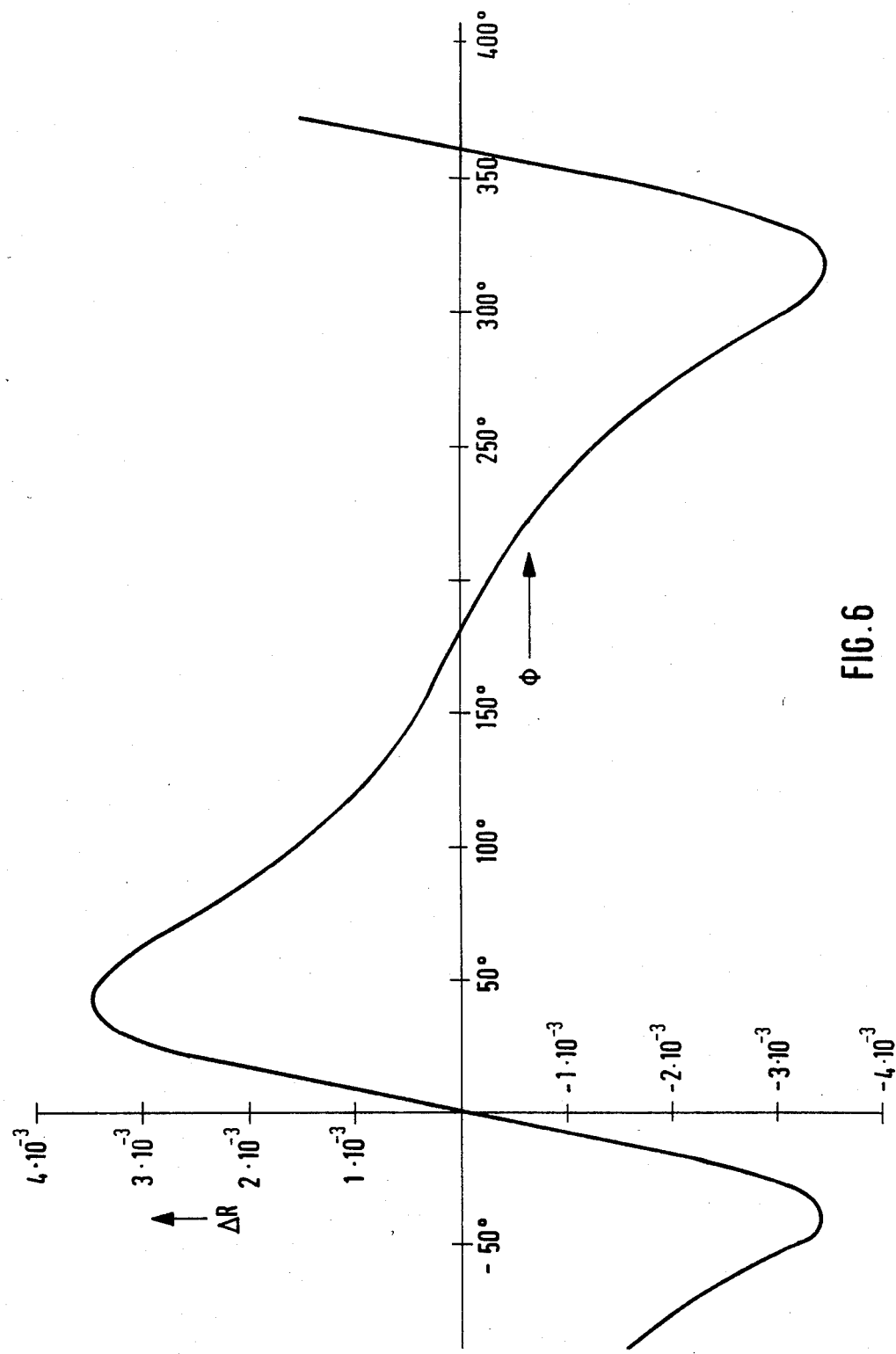
FIG. 6 shows the differential reflectivity $\Delta R$ as a function of the phase angle $\phi$.

The reflectivity R* must lie typically above the value 99% in order for the laser circuit to oscillate and remain in operation at all. For this purpose it is necessary to know δ and R* as functions of the phase relationship $\phi$. FIG. 5 illustrates this relationship. Calculations are made with the parameters Δ/2=22.5°, T=0.005, R=0.995, Q=0.1 It will be seen that the maximum of the phase shift δ introduced lies at $\phi$=0°, while the reflectivity R* has a minimum value here. Calculation shows that a loss factor Q of 0.1 must be chosen in order to achieve the necessary reflectivity R* of 99% for an uncoupling mirror with T=0.5%. Since, in addition, the effective reflectivity R* is equal for both the contra-rotating wave trains, the second radiation path must be stable. The differential reflectivity (for left and right rotating beams) ΔR (see FIG. 6 and equation (7)) shows symmetry only at $\phi$=180° and $\phi$=0°.

$$\Delta R = \alpha(\phi, \Delta/2)^2 - \alpha(\phi, -\Delta/2)^2 + \beta(\phi, \Delta/2)^2 - \beta(\phi - \Delta/2)^2 \tag{7}$$

since ΔR=0 here. However, it is only convenient to adjust to $\phi$=0° since the coupled-in phase shift δ is at a maximum here.

Figure 7:
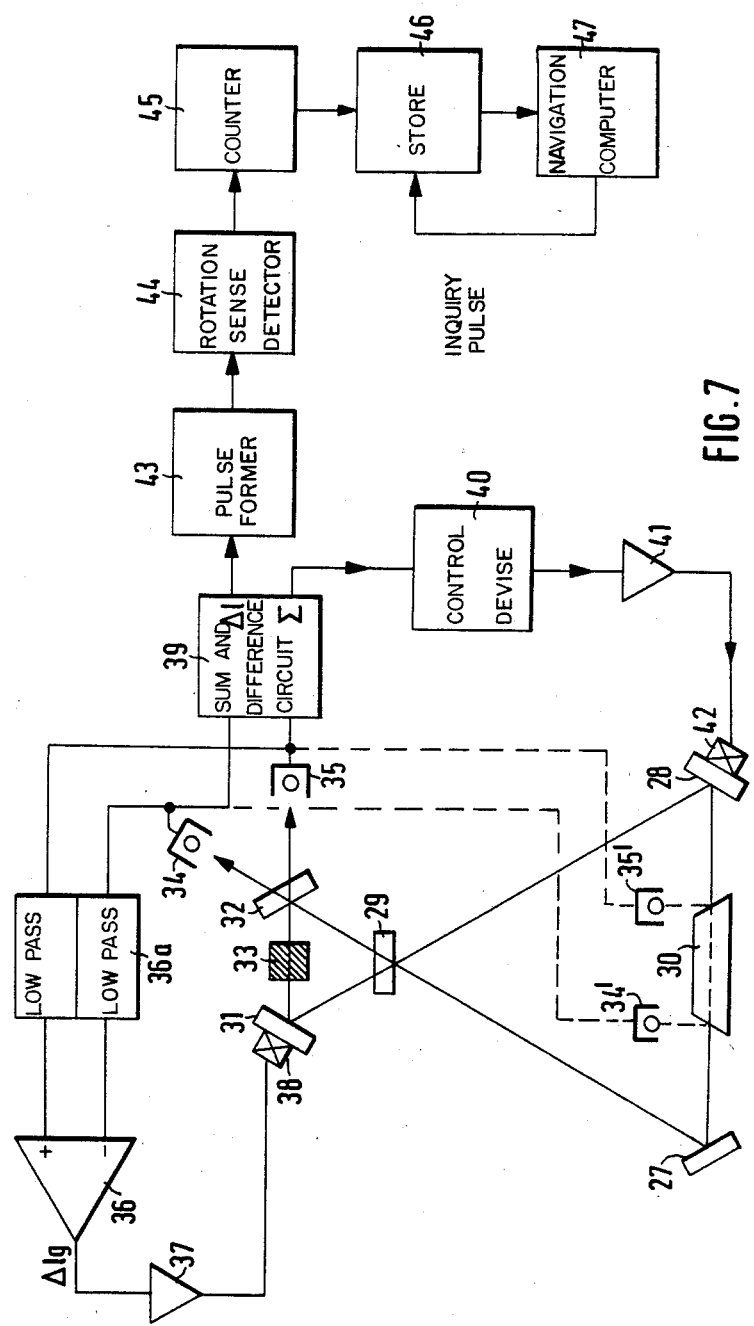
FIG. 7 shows a sensor of rotational velocity on the basis of a ring laser designed according to the invention.

An embodiment of a sensor of rotational velocity on the basis of a ring laser according to FIG. 4 is illustrated in FIG. 7. Stabilisation and reading out of the laser circuit may take place as in FIG. 7. The mirrors 27, 28 and 29 form the first radiation path with the gas discharge tube 30, and the mirrors 29, 31 and 32 with the Faraday cell 33 form the second radiation path. The mirror 32 is partially transparent and the radiation which passes through it impinges on the photodetectors 34 and 35. The incident radiation produces signals $I_1$ and $I_2$ proportional to the intensity of the radiation, from which the sum Σ and the difference ΔI are formed in the electronic system 39. The sum signal Σ is led to a control device 40 which controls a high voltage amplifier 41. The high voltage produced in the amplifier 41 serves to control a piezo-adjustment device 42 which stabilises the first radiation paths in that it moves the mirror 28 parallel to itself. The difference signal ΔI is modulated by the difference frequency Δν proportional to the velocity of rotation $\omega$. Rectangular signal pulses are generated by means of a pulse former 43 and then reach the device 44 for recognition of the direction of rotation. Recognition of the direction of rotation may, for example, take place by the method described in DE OS No. 30 09 796. A counter 45 sums the pulses and transmits the state of the counter to the store 46 from which it is called up by means of a trigger pulse from the navigation computer 47.

Reading out of the laser circuit may also take place by means of the corner mirror 27 of the first radiation path. In addition reading is possible also at the ends of the gas discharge tube 30 by means of photodetectors 34' and 35' (as shown in dashed lines) with the advantage that practically no decoupling of energy from the ring laser takes place.

In the embodiment illustrated, control of the second radiation path takes place by the formation of the difference of the signals of the diodes 34 and 35 behind the low passes 36a in a differential device 36. The difference signal $\Delta Ig$ is utilised as a control magnitude for a high voltage amplifier 37 which drives a piezo adjustment device 38 on the mirror 31 in such a way that the length of the second radiation path remains constant. With a second radiation path with a Faraday cell having a garnet layer of thickness 5 $\mu$m (Q=0.665, $\Delta = 10°$, T=0.5%) bias, values of about 6% (=approximately 20 kHz) are achieved.

In principle, it is also possible to increase the effect of the second radiation path by means of an active medium provided in the radiation path so that the magnitude of the parameter Q can be varied between wide limits. But it must be recognised here that the equation (6,6a) only holds for Q.R<1.

In the case in which the second radiation path is constructed in such a way that thermal changes and other disturbing effects do not alter the phase state, and thus the optical path, at all or only slightly and the changes which occur only do so slowly, it is also possible to completely eliminate stabilisation of the second radiation path and to employ the signals decoupled at the decoupling mirror 32 for stabilisation of the first radiation path.

What we claim as our invention and desire to secure by Letters Patent of the United States is:

1. A sensor of rotational velocity on the basis of a ring laser, comprising
   (a) a first radiation path having three corner mirrors and leading through an active medium,
   (b) a second radiation path leading through a Faraday cell causing a phase difference between two radiation beams circulating in opposite directions, the second radiation path having three corner mirrors one of which is common to the two radiation paths and has a transparency of 5% at maximum,
   (c) the second radiation path being formed as a passive resonator,
   (d) the Faraday cell being constructed with a ferromagnetic garnet compound magnetized to saturation,
   (e) first adjusting means for stabilizing the optical length of the second radiation path by adjusting one of its corner mirrors, which is not the one that is common to both radiation paths, parallel to itself and perpendicularly to its plane, and
   (f) means for detecting, from shares of the clockwise and anticlockwise circulating beams penetrating that one of the corner mirrors of the second radiation path which is not common to both radiation paths and is not adjustable, the phase shift resulting from the effective rotation of the ring laser about its vertical axis.

2. A sensor of rotational velocity according to claim 1, wherein said first adjusting means is a first piezo device, two photo-detectors are provided, each for a respective one of the beams penetrating said one of the corner mirrors which is not common to the two radiation paths and is not adjustable, respective low pass devices connected to receive the output signals of said photo-detectors, a differential device connected to receive the output signals of said low pass devices, and a high voltage amplifier connected to receive the output signals of said differential device and delivering the adjusting value for said first piezo device.

3. A sensor of rotational velocity according to claim 1, wherein second adjusting means are provided for stabilizing the optical length of the first radiation path by adjusting one of its mirrors, which is not the one that is common to both radiation paths, parallel to itself and perpendicularly to its plane, said second adjusting means being a second piezo device, two photo-detectors are provided, each for a respective one of the beams penetrating said one of the corner mirrors of the second radiation path which is not common to the two radiation paths and is not adjustable, a summing device is provided which is connected to receive the output signals of said photo-detectors, a control device is connected to receive output signals from said summing device, and a high voltage amplifier is connected to receive output signals from said control device and delivers the adjusting value for said second piezo device.

* * * * *